(12) United States Patent
Landskron et al.

(10) Patent No.: US 7,340,974 B2
(45) Date of Patent: Mar. 11, 2008

(54) SPINDLE GEAR FOR AN ADJUSTING DEVICE IN A MOTOR VEHICLE SEAT

(75) Inventors: Robert Landskron, Monheim am Rhein (DE); Michael Lingner, Düsseldorf (DE); Arif Karadag, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 11/319,087

(22) Filed: Dec. 27, 2005

(65) Prior Publication Data

US 2006/0170266 A1   Aug. 3, 2006

Related U.S. Application Data

(63) Continuation of application No. 10/773,648, filed on Feb. 6, 2004, now abandoned.

(30) Foreign Application Priority Data

Feb. 24, 2003   (DE) ................. 103 08 028

(51) Int. Cl.
*B60N 2/02* (2006.01)
*F16H 1/16* (2006.01)

(52) U.S. Cl. .................... 74/425; 297/362.14; 248/124

(58) Field of Classification Search ......... 74/425; 297/362.14; 248/424, 298.1; 384/906
See application file for complete search history.

(56) References Cited

U.S. PATENT DOCUMENTS

| | | | |
|---|---|---|---|
| 1,819,889 A * | 8/1931 | Getz ..................... | 74/337.5 |
| 2,424,208 A * | 7/1947 | Poupitch ................. | 411/134 |
| 3,848,477 A | 11/1974 | Giandinoto et al. | |
| 3,951,004 A | 4/1976 | Heesch | |
| 4,645,159 A | 2/1987 | Terada et al. | |
| 4,802,374 A | 2/1989 | Hamelin et al. | |
| 4,962,963 A * | 10/1990 | Robinson ............... | 297/362.11 |
| 5,222,402 A | 6/1993 | White et al. | |
| 5,273,242 A | 12/1993 | Mouri et al. | |
| 5,292,164 A | 3/1994 | Rees | |
| 5,349,878 A | 9/1994 | White et al. | |

(Continued)

FOREIGN PATENT DOCUMENTS

DE   1 755 740 A   1/1972

(Continued)

*Primary Examiner*—Richard Ridley
*Assistant Examiner*—Terence Boes
(74) *Attorney, Agent, or Firm*—Akerman Senterfitt

(57) ABSTRACT

A spindle gear for a motor vehicle seat adjusting device having a housing, a spindle nut, a spindle and a worm wheel. The spindle nut may have an external bearing surface and a bearing shell may include an internal bearing surface cooperating with the external bearing surface. The spindle nut may have a slide lacquer coat. The spindle nut may have an external bearing surface and a stop disk may be attached to the external bearing surface so as to surround it. A projection may engage a corresponding spindle nut recess. The housing may comprise at least two housing parts made of zinc diecasting. The external teeth of the spindle nut may form a globoidal gear. The external spindle nut teeth may have an outer diameter that is smallest in an axial center thereof and increases toward the axial end regions.

4 Claims, 1 Drawing Sheet

U.S. PATENT DOCUMENTS

| | | |
|---|---|---|
| 5,516,071 A | 5/1996 | Miyauchi |
| 5,709,363 A | 1/1998 | Matsuhashi |
| 5,797,293 A | 8/1998 | Chaban |
| 5,860,319 A | 1/1999 | Via |
| 5,909,866 A | 6/1999 | Vaidyanathan et al. |
| 5,924,668 A | 7/1999 | Garrido |
| 6,138,974 A | 10/2000 | Okada et al. |
| 6,260,922 B1 | 7/2001 | Frohnhaus et al. |
| 6,322,146 B1 * | 11/2001 | Fisher, Jr. .............. 297/362.14 |
| 6,547,332 B2 * | 4/2003 | Pejathaya .............. 297/362.14 |
| 7,051,986 B1 * | 5/2006 | Taubmann et al. .......... 248/429 |
| 2004/0094364 A1 * | 5/2004 | Hammill .................... 184/6.12 |

FOREIGN PATENT DOCUMENTS

| | | |
|---|---|---|
| DE | 41 01 470 C1 | 6/1992 |
| GB | 2138912 A * | 10/1984 |
| WO | WO 86/06036 | 10/1986 |

* cited by examiner

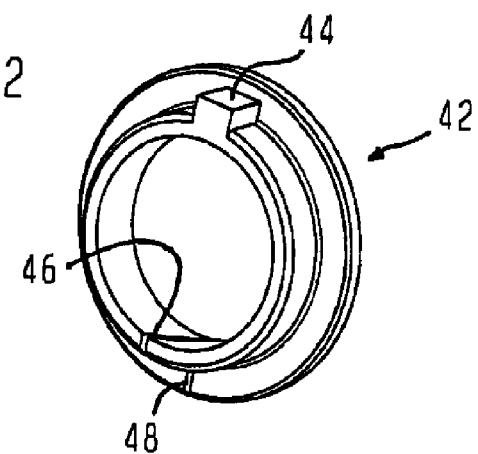
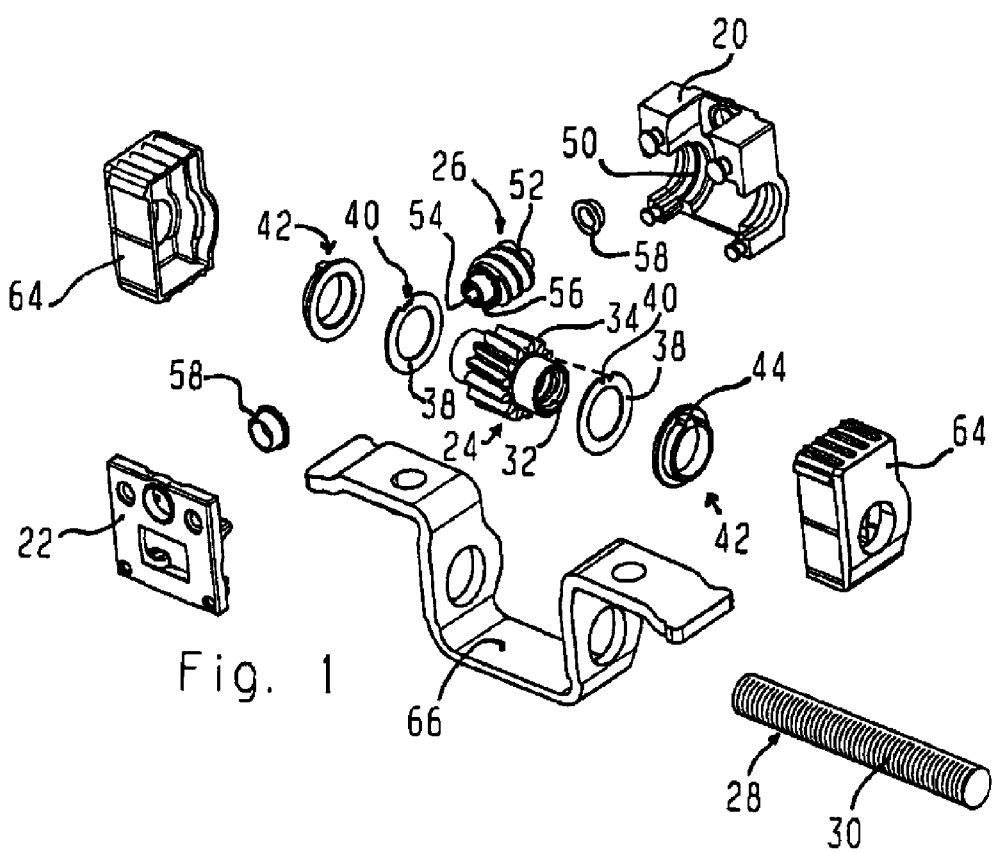
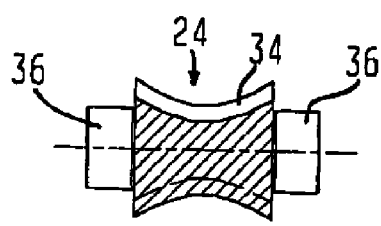
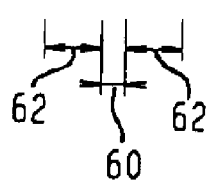

SPINDLE GEAR FOR AN ADJUSTING DEVICE IN A MOTOR VEHICLE SEAT

The invention relates to a spindle gear for an adjusting device in a motor vehicle seat, more specifically for a lengthwise adjustment device of a motor vehicle seat. The spindle gear has a housing, a spindle nut, which is rotatably carried within the housing, has an internal thread matching a longitudinally extending thread of the spindle and is comprised of external teeth, and a worm wheel that is rotatably carried within the housing and is comprised of a worm that meshes with the external teeth of the spindle nut.

Spindle gears are successfully utilized in motorized vehicle seats. They more specifically serve to longitudinally adjust the motor vehicle seat but may as well be utilized for performing other adjustment tasks such as reclining adjustment of the seat back, vertical adjustment of the seat, and so on. The drive thereby uses an electric motor. Electric motors operate at quite high RPM, the spindle gear permitting to achieve a very considerable gear reduction ratio for each line unit. The gear reduction thereby occurs in two stages. The worm wheel rotates at a RPM speed that corresponds to the speed of the electric motor. A first transmission is achieved by the worm gear between the worm wheel and the external teeth of the spindle nut. In the second transmission stage mating occurs between spindle nut and spindle, the latter being provided with a screw thread.

The spindle thread must be capable of transmitting a certain torque. If used in a lengthwise adjustment device, the torque transmitted must be high enough to suffice for the movement of a person sitting on the motor vehicle seat. The noise level must thereby remain low. A change in the direction of rotation occurring for example during switching between fore and aft adjustment is not allowed to generate a noticeable noise. This must apply to all of the usually occurring seat loads.

Finally, the spindle gear must also be capable of taking impact forces as they occur for example in a frontal crash of a motor vehicle. Together with the spindle, the spindle gear secures the longitudinal position of the motor vehicle seat. Here, sufficient provisions must be made to prevent crash acceleration from leading to unwanted adjustment of the motor vehicle seat.

Numerous embodiments of spindle gears have been previously known in the art and the reader is referred, by way of example only, to the following documents WO 86-06036 A; DE 41 001 470 C; DE 1755740 A; U.S. Pat. No. 6,260,922 B 1; U.S. Pat. Nos. 5,222,402 and 5,349,878.

In view of these spindle gears, it is the object of the invention to indicate a particularly smooth running spindle gear that, accordingly, makes little operating noise under all operating conditions.

In view of the spindle gear of the type mentioned herein above, the solution to this object is achieved in that at least one, preferably several or all, of the following features are met:

that the spindle nut comprises at least one external bearing surface that is axially offset relative to the external teeth, that a bearing shell is provided that comprises an internal bearing surface cooperating with the external bearing surface, that the bearing shell comprises an axial slot and that the bearing shell is inserted within the housing so as to be secured against torsion and/or that the spindle nut comprises a slide lacquer coat, said coat being provided on the external teeth and/or on the internal thread and/or that the spindle nut comprises at least one external bearing surface that is axially offset relative to the external teeth, that a stop disk is provided that is placed onto said external bearing surface so as to surround it, that the stop disk has a projection (e.g., an axial one) that engages into a corresponding recess of the spindle nut, more specifically between two teeth of the external teeth of the spindle nut, and forms an antirotation lock and/or that the spindle nut comprises at least one external bearing surface that is axially offset relative to the external teeth, that a stop disk is provided that is attached to said external bearing surface so as to surround it and that the stop disk comprises a slide lacquer coat and/or that the housing is composed of at least two housing parts that are made of zinc diecasting and/or that the external teeth of the spindle nut are a globoidal worm gear and/or that the external teeth of the spindle nut have an outer diameter that is smallest in the region of the axial center thereof and that increases toward the axial end regions, more specifically in the form of a curve.

It has been found that each of these features is advantageous for reducing the operating noise of the spindle gear around its mounting location within the vehicle seat. Preferably, all of the features mentioned are implemented although merely providing the spindle gear with some of the features already proved advantageous as well. The mere use of but one of the features indicated already detectably reduces the operating noise.

The various features mentioned will be discussed herein after:

Usually, bearing shells are configured to be annular; now, it is suggested that the bearing shell be provided with a slot that is for example oriented radially. Two end faces that are separated by an air gap are thus formed. Said air gap may vary during operation. This variation permits to compensate for mechanical deviations during rotation. The material of the bearing shell preferably has elastic properties, a metal is used for example.

Coating the spindle nut with a slide lacquer permits on the one side to reduce friction between spindle nut and longitudinal thread of the spindle and on the other side to lower the noise level. The term slide lacquer coat is to be construed herein as any lacquer coating such as $MoS_2$ anti-friction films, $MoS_2$ lacquers or plastics such as polytetrafluor ethylene (PTFE) or similar polymers.

Locking rotation of the stop disk relative to the spindle nut noticeably lowers the noise level. Now, the stop disk is no longer a plain washer that somehow moves more or less together with the nut, it now rotates together with the spindle nut. The locking of the stop is achieved by an axial projection protruding from the stop disk and cooperating with the spindle nut, preferably engaging between neighboring teeth. Thus, the mechanical expense for locking rotation is extremely low. Kinematic inversion is also possible, the spindle nut being provided, for this very purpose, with the projection and the stop disk with a mating recess.

Coating the stop disk, meaning more specifically the two radially oriented surfaces, with a slide lacquer coat, leads to an operating noise reduction.

Basically, housings that are composed of two or more housing parts are known. For reducing the operating noise by constructional design, a housing made of zinc diecasting has proved efficient; it constitutes an advantageous combination, in particular in combination with the other features.

The globoidal engagement of the external teeth of the spindle nut results in an advantageous smooth meshing and reduces the operating noise.

As compared to a mere axial shape, the curved shape of the spindle nut as viewed in axial section increases the surfaces of contact with the worm thread of the worm wheel.

The applicant reserves the right to claim each and every of the features a)-g) mentioned and any combination thereof.

Further embodiments of the invention are recited in the subordinate claims, with only some of them being discussed herein after.

Further, it has been found advantageous to non-rotatably dispose the bearing shell relative to the housing. For this purpose, the bearing shell has a lug that projects radially and/or axially, the housing having a mating recess. Kinematic inversion is also possible, with, in this case, the housing having the lug and the recess being provided in the bearing shell. Preferably, the lug is thereby disposed diametrically opposite the slot of the bearing shell. As a result thereof, the mobility of the bearing shell in the region of the slot is least affected by the antirotation lock.

Eventually, it is advantageous to configure the curved shape of the external teeth in such a manner that a substantially axially oriented, short central contour line is provided. Said central contour line is then adjoined on either side with a curved contour line. This allows for compensating the tolerances, which again aids in reducing the noise.

Further advantages and characteristics of the invention will become more apparent upon reading the following non restrictive description of an exemplary embodiment thereof, given with reference to the drawing in which:

FIG. 1 is an exploded assembly drawing of a spindle gear,

FIG. 2 is a perspective view of the bearing shell as shown in FIG. 1 and

FIG. 3 is an axial section through a worm wheel shown in a modified configuration with respect to FIG. 1.

The spindle gear has a housing that is composed of a first housing part 20 and of a second housing part 22. The two parts are made of zinc diecasting. The two parts 20, 22 are joined together by riveting. The housing 20, 22 forms an inner volume and bearing regions for a spindle nut 24 on the one side and for a worm wheel 26 on the other side. In the axial direction, the housing 20, 22 is open throughout for receiving a spindle 28 that is merely outlined herein. It has a longitudinal thread 30.

The spindle nut 24 has an internal thread 32 that meshes with the longitudinal thread 30 of the spindle 28 and external teeth 34. In the implementation shown in FIG. 1, the outer lines of the external teeth 34 lie on a cylinder. On either side of the external teeth 34, an external bearing surface 36 is formed, said external bearing surface being cylindrical and having an outer diameter that is smaller than the outer diameter of the external teeth 34 at the bottom of the spaces between the teeth, meaning smaller than the dedendum circle of the teeth 34.

A flat stop disk 38 is attached to each external bearing surface 36. It is coated with a slide lacquer, more specifically with PTFE on its two main surfaces, preferably allover. It has a projection 40 which, in the embodiment shown, protrudes axially although it may as well be configured on a radial axis. In the assembled condition, said axial projection 40 engages between two teeth of the external teeth 34, thus providing an antirotation lock. Said lock may be provided with a certain clearance which may be adjusted by, for example, adjusting the projection, for example its dimensions, in the circumferential direction.

Outside of each stop disk 38, a bearing shell 42 in turn forms a grip around a respective one of the external bearing surfaces 36. As compared to the axially relatively thin stop disk 38, the bearing shell has an axial length in the range of several millimeters, e.g., of 3-6 millimeters. In terms of facts, it consists of a ring that substantially corresponds to the ring of the stop disk and of a collar of a smaller outer diameter that is turned away from the external teeth 34. Together, these two portions form the inner bore. A lug 44 projects radially from the collar. On the diametrically opposite side thereof a slot 46 is formed so that the bearing shell 42, while being made from one piece, is substantially implemented with the shape of a C. The slot 46 is provided with small dimensions ranging for example from 0.1 to 2 mm. It provides an air gap 46. In the embodiment shown, the slot is obtained by a cut that is made in the radial and the axial direction. The air gap 48 may be defined otherwise as well.

The bearing shell 42 is made from a metal that has advantageous slide properties relative to the metal from which the spindle nut 24 is made. It is also possible to manufacture the spindle nut 24 from reinforced plastics.

In the first housing part 20, bearing grooves 50 are provided for receiving the outer edge of the bearing shell 42. The housing 20, 22 also comprises a recess receiving the lug 44 so that the bearing shell 42 is prevented from rotating relative to the housing 20, 22.

Further, the worm wheel 26 is carried within the housing 20, 22. Its axis substantially forms a right angle and is offset relative to the axis of the worm wheel 26 and of the spindle 28. It has a worm 52 on its outer case and within a polygonal seat 54 for receiving an elastic drive shaft. At each axial end, the worm wheel 26 is rotatably carried on a ball bearing 56 within the housing 20, 22. Bearing bushes 58 that are similar to the bearing shells 42 are additionally provided.

FIG. 3 shows an axial section through a spindle nut 24 that is modified relative to the implementation shown in FIG. 1. The lines of the top lands of the external teeth 34 now no longer lie on a cylinder but on a rotational body that bears certain similarity to a diabolo or a yarn reel. As shown in FIG. 3, the external teeth 34 have a substantially axially oriented central contour line 60 that extends over a quite short axial distance of for example 0.5-3 mm, preferably of 1.5 mm. It is oriented parallel to the axis of the spindle nut 34. On either side, said central contour line 60 is homogeneously and continuously adjoined with a curved contour line. As a result, the outer diameter of the external teeth 34 increases steadily, reaching its maximum in the respective border region of the external teeth 34. The contours 60, 62 may be roughly described as a circle the diameter of which is greater than the outer diameter of the worm wheel 26. It preferably may be 1.5-3 times the outer diameter of the worm wheel 26.

For silencing, two shells 64 made of rubber or of a corresponding material straddle the gear in a manner well known in the art, said gear being accommodated in a substantially U-shaped bearing angle 66.

The invention claimed is:

1. A spindle gear for an adjusting device in a motor vehicle seat, said spindle gear comprising
   a spindle having a longitudinally extending thread,
   a housing,
   a spindle nut, which is arranged within the housing, is rotatable within the housing, has an internal thread matching the thread of the spindle and comprises external teeth, and a worm wheel that is arranged within the housing, is rotatable within the housing and comprises of a worm that meshes with the external teeth of the spindle nut, wherein the spindle nut comprises at least one external bearing surface that is axially offset relative to the external teeth, a stop disk is provided that is attached to said external bearing surface to surround it, and the stop disk has a projection which engages into a corresponding recess of the spindle nut and forms an antirotation lock, wherein the projection engages between two neighboring teeth of the external teeth of the spindle nut.

2. The spindle gear according to claim 1, wherein the at least one external surface of the spindle nut is cylindrical and two bearing surfaces are provided, the external teeth being located between the two bearing surfaces.

3. The spindle gear according to claim 1, wherein a bearing shell has an outer border and the housing forms a receiving groove mating with said outer border.

4. The spindle gear according to claim 1, wherein the spindle gear is for a lengthwise adjustment device of a motor vehicle seat.

* * * * *